US000001364H

United States Statutory Invention Registration [19]

[11] Reg. Number: H1364

Toeppen

[43] Published: Oct. 4, 1994

[54] FLUORESCENT FIBER DIAGNOSTICS

[75] Inventor: John S. Toeppen, Livermore, Calif.

[73] Assignee: The United States of America as represented by the United States Department of Energy, Washington, D.C.

[21] Appl. No.: 70,825

[22] Filed: Jun. 3, 1993

[51] Int. Cl.[5] ..... G01J 1/58

[52] U.S. Cl. ..... 372/6; 372/70; 250/227.14; 250/577

[58] Field of Search ..... 372/4–6, 372/70; 385/27, 30, 123, 141–143; 250/227.14, 227.18, 361 R, 362, 363.01, 368, 458.1, 459.1, 483.1, 484.1, 577

[56] References Cited

U.S. PATENT DOCUMENTS

| | | | |
|---|---|---|---|
| 4,942,306 | 7/1990 | Colbourne | 250/577 |
| 5,051,595 | 9/1991 | Kern et al. | 250/458.1 |
| 5,064,271 | 11/1991 | Kern et al. | 385/123 X |
| 5,225,925 | 7/1993 | Grubb et al. | 372/6 X |

OTHER PUBLICATIONS

York brochure for "Neodymium-doped Single-mode Optical Fiber," Feb., 1987, 2 pages.

BICRON brochure for a BCF-10 blue-emitting, plastic scintillating fiber, Oct., 1990, 2 pages.

*Primary Examiner*—Bernarr E. Gregory

*Attorney, Agent, or Firm*—Miguel A. Valdes; Roger S. Gaither; William R. Moser

[57] ABSTRACT

A fluorescent fiber (13) having a doped core (16) is pumped (11) by light (18) of a relatively short wavelength to produce fluorescence at a longer wavelength that is detected by detector (24). The level of fluorescence is monitored (26) and evaluated to provide information as to the excitation of the fiber (13) or the environment thereof. In particular, the level of intensity of the detected fluorescence may be used to measure the intensity of a light beam (18) passing axially through an optical fiber system (12) (FIG. 1), or the intensity of a light beam (46) passing radially through a fluorescent fiber (13) (FIG. 2), or the level of a fluid (32) in a tank (31) (FIG. 3), or a scintillation event (37) in a fluorescent fiber (13) pumped to produce amplification of the scintillation event (FIG. 4).

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

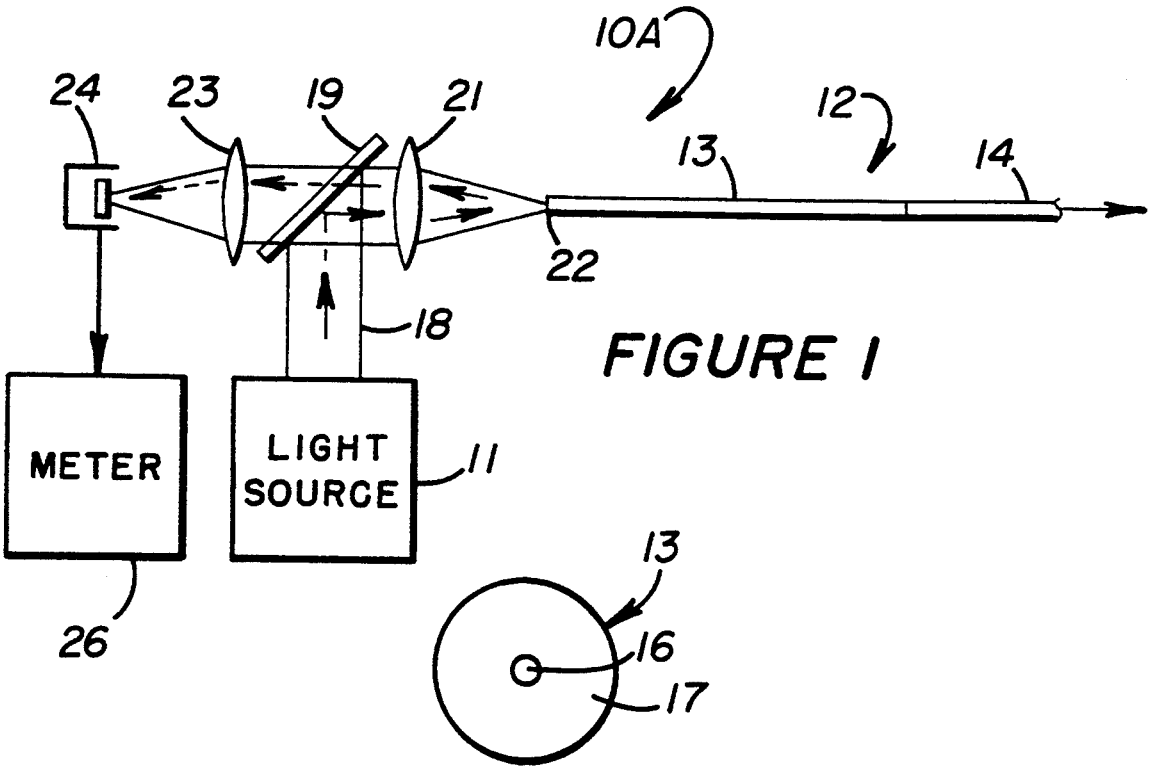
FIGURE 1
FIGURE 2
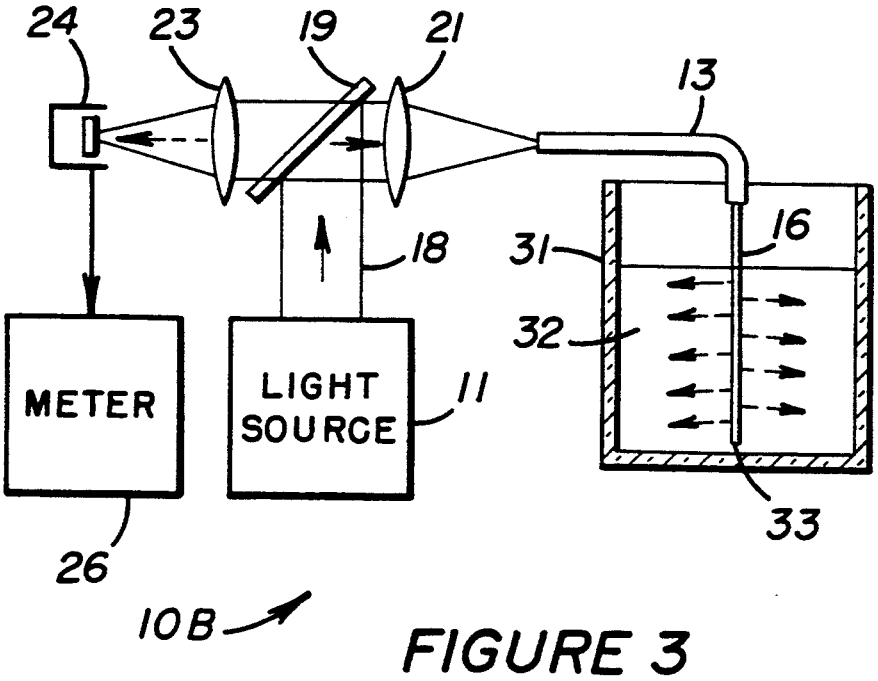
FIGURE 3

FLUORESCENT FIBER DIAGNOSTICS

The Government has rights in this invention pursuant to Contract No. W-7405-ENG-48 between the U.S. Department of Energy and the University of California.

BACKGROUND OF THE INVENTION

This invention relates to fluorescent optical fibers and more particularly to the diagnosis of the nature or condition of an excitation beam and/or the environment of the optical fiber by an analysis of the emitted fluorescence from the fiber.

In recent years, optical fibers have been developed with doped cores that will fluoresce at a relatively long wavelength when the core is pumped by light of a shorter wavelength. For example, an optical fiber has been developed by York Ventures of Special Optical Products Ltd., Hampshire, England, having a core of germano-silicate ($GeO_2$-$SiO_2$) glass doped with neodymium ions ($Nd^{3+}$) which will fluoresce in a broad band from 850 to 985 nanometers with a peak at 950 nanometers in the near-infrared when pumped by light of 510 and/or 585 nanometers. Such fibers have been used for fiber lasers, fiber amplifiers, temperature sensors and for wavelength filtering.

Also, for example, a fiber has been developed by Bicron Corporation, Newbury, Ohio, wherein a plastic scintillating fiber with a polystyrene doped core will fluoresce in the ultraviolet region when the core is excited by charged particles or neutrons. The ultraviolet light is then converted into visible light by fluorescent dye present within the fiber. Such fibers have been commonly used in particle physics experiments.

Other diagnostic uses of fluorescent fibers have been in the detection of color changes in the fluorescent materials in the presence of chemicals.

The present invention relates to new uses of fluorescent optical fibers to diagnose the condition of the excitation and/or environment of a fluorescent fiber by an evaluation of the fluorescence emitted from an end of the fiber.

SUMMARY OF THE INVENTION

It is the principal object of the invention to provide a method for evaluating the excitation or environment of an excited fluorescent fiber by an evaluation of the fluorescence in the fiber.

Additional objects, advantages and novel features will be set forth in the description which follows, and in part will become apparent to those skilled in the art upon examination of the following, or may be learned by practice of the invention. The objects and advantages of the invention may be realized and attained by means of instrumentalities and combinations pointed out in the appended claims.

To achieve the foregoing and other objects, and in accordance with the present invention as described and broadly claimed herein, a diagnostic method is provided using a fluorescing optical fiber having a doped core that will fluoresce at one wavelength when pumped by light of another wavelength, wherein the core is pumped with light to cause fluorescence in the core, wherein the fluorescence emitted from an end of the fiber is detected, and wherein the degree of intensity of the detected fluorescence is monitored.

A further aspect of the invention is that when the excitation light is from a copper-vapor laser, an 15 optical fiber with a neodymium-doped core is used for fluorescence at around 950 nanometers in response to absorption of green and yellow light from the copper-vapor laser at 510 and 578 nanometers.

BRIEF DESCRIPTION OF THE DRAWINGS

The accompanying drawings, which are incorporated in and form part of the application, together with the description, serve to explain the principles of the invention.

FIG. 1 is a generally schematic illustration of the use of a fluorescent fiber in the diagnosis of the amount of excitation light injected into one end of the fiber.

FIG. 2 is an end view of the fluorescent fiber of FIG. 1, as seen from line 2—2 thereof.

FIG. 3 is a generally schematic illustration of the use of a fluorescent fiber in the diagnosis of the environment in which the fiber is disposed.

DESCRIPTION OF THE PREFERRED EMBODIMENTS

Figure 4:
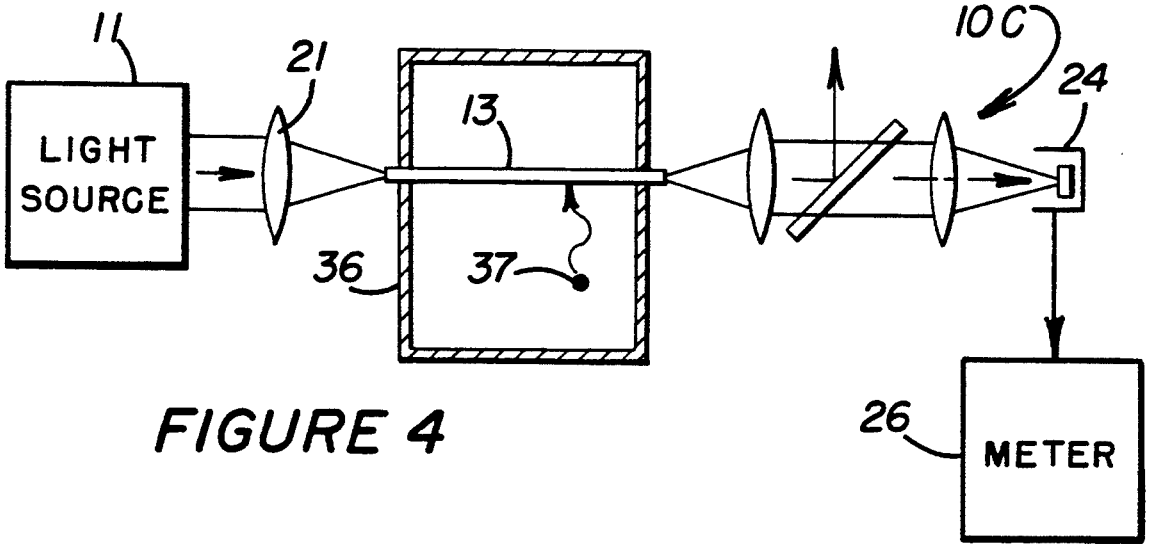
FIG. 4 is a generally schematic illustration of the use of a fluorescent fiber in the diagnosis of scintillation events.

Referring now to the drawings, wherein preferred embodiments of the invention are shown, FIGS. 1 and 2 illustrate a system 10A wherein the amount of power from a light source 11, such as a laser, injected into a optical fiber system 12 for transmission to a remote location is to be determined. For diagnostic purposes, a section of a fluorescent optical fiber 13 is spliced to the remainder 14 of system 12, the fluorescent fiber 12 having a core 16 surrounded by a suitable cladding 17, the core 16 being doped to absorb light at the wavelength of light source 11 and to fluoresoe at a longer wavelength in response to such absorption.

The light beam 18 (indicated by the solid arrows) from light source is reflected from dichroic splitter 19 through injection lens 21 into the end 22 of the fluorescent fiber 13 for transmission through the fiber optic system 12. The amount of dopant in core 16 should be controlled to allow more than 99% of the output of light source to pass through the diagnostic fiber 13 without attenuation.

About half of the absorbed light in the fiber 13 will be converted into fluorescence. The fluorescence 15 in the fiber 13 will occur in all directions, but some portion of the fluorescence will be captured and contained within the core 16. This trapped portion of the fluorescence will be transmitted by total internal reflection through fiber 13 for emission from end 22 of the fiber 13. The emitted fluorescence, having a wavelength different from that of light source 11 and indicated by the dotted arrows, will pass through injection lens 21, dichroic splitter 19 and detection lens 23 to detector 24. The output of detector 24 is sent to meter 26, or another suitable monitoring device, for measurement and/or other monitoring of the intensity of the detected fluorescence.

Prior to the present invention, the intensity of light beam 18 in an optical fiber system 12 had been measured indirectly by the amount of leakage of the light through the side of the optical fiber. The present method is much superior in that the amount of induced (and subsequently detected) fluorescence is a direct function of the amount of light that is successfully passing through the core of the system.

The power of the light in a fiber had also been previously determined at the output end of the optical fiber system. Such measurement is not only intrusive, but often at a considerable distance from the input end. Frequently, the reason to measure the power within a fiber is to optimize the adjustment of the injection optics. By measuring the fluorescent output of the fiber 13 at the injection end the task is simplified and is truly representative of the power injected into the system.

In instances wherein the light source 11 is a copper-vapor laser, emitting at 510 nanometers in the green and 578 nanometers in the yellow, it is highly advantageous to use a fluorescent fiber 13 doped with neodymium ions ($Nd_{3+}$), as previously mentioned. A small amount of neodymium will strongly absorb light at both the 510 and 578 wavelengths of a copper-vapor laser, with fluorescence being indicated at around 950 nanometers.

FIG. 3 illustrates another diagnostic system OB in which light 18 from light source at a constant level, is injected into one end of a fluorescent optical fiber 13 to cause fluorescence at a different wavelength therein. In this instance, the fiber 13 has the other end thereof disposed in a tank 31 filled with a variable amount of liquid 32 or a gas at a variable pressure. The portion of the fiber 13 within the tank has the cladding 17 removed therefrom to expose the core 16. Since light is contained within an optical fiber by total internal reflection, the amount of the light lost through the wall of the core will depend on the index of refraction of the material surrounding the core. The higher the index of refraction, the greater the loss from the fiber. Thus, in the system 10B of FIG. 3, very little loss will occur from the core 16 of the fiber in tank 31 where it is above the fluid level and surrounded by air, while considerable loss (indicated by the dotted arrows in liquid 32) of the fluorescent light in core 13 will occur where the core is surrounded by the liquid 32. Similarly, a change in this index of a gas surrounding a fiber will affect the conditions of total internal reflection in an enclosed fiber.

The total loss of fluorescent light from core 13 will depend on the ratio of the amount of core in and out of the liquid 32. As a consequence, with a constant level of excitation from light source 11, the intensity of the fluorescent light detected by detector 24 and monitored by meter 26 will provide a measurement of the level of the fluid in tank 31. This method can be used to measure the level of water in a well, the level of fuel within a tank, or the pressure of a gas surrounding the fiber.

Preferably, the end 33 of the core 16 in the bottom of tank 31 is coated with a reflective material so that the fluorescent light within the core that would otherwise be emitted from end 33 is reflected back towards detector 24.

FIG. 4 illustrates yet another diagnostic system 10C in accordance with the present invention, wherein a fluorescent fiber 13, preferably of the scintillating type such as the Bicron fiber referred to above, is disposed in a chamber 36 to detect a scintillation event, indicated at 37, wherein a neutron flux will cause an ultraviolet emission which is absorbed by the dye dopant in the core 16 of fiber 13.

In this system, doped core 16 of fiber 13 is pumped by light source 11, with the level of pumping being such that the fluorescent level is at a steady state just below that at which it will lase. The absorption of the dopant of a small amount of energy from a scintillation event will then cause lasing to occur in the core 16, with a consequent amplification of the energy from the scintillation event.

Figure 5:
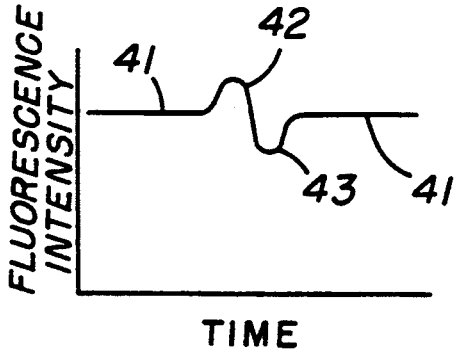
FIG. 5 is a graph showing the intensity of the detected fluorescence in the system of FIG. 4 in response to a scintillation event.

FIG. 5 illustrates the steady state level 41 of fluorescence from light source 11, with a transient surge 42 of fluorescence from the pumping of the core by the scintillation event 37 that passes through the wall of the fiber 13, followed by a below-normal fluorescent level 43 while the excited state repopulates before returning to normal.

The fluorescent light in fiber 13, fluctuating as in FIG. 5, is emitted from the fiber core and passes through lens 46, dichroic splitter 47 and lens 48 to detector 24, with the changes in intensity of the fluorescent light being monitored at 26 to indicate the presence of scintillation events.

Thus, in this system, the fluorescent fiber 13 serves both as an amplification device as well as its usual role as a scintillation detector when configured with appropriate pumping from light source 11.

Although the detector 24 is shown as arranged to receive fluorescent light from the end of fiber 13 opposite to the end pumped by light source 11, the detector 24 and light source 11 can instead be at the same end of fiber 13, as illustrated in FIG. 1.

Figure 6:
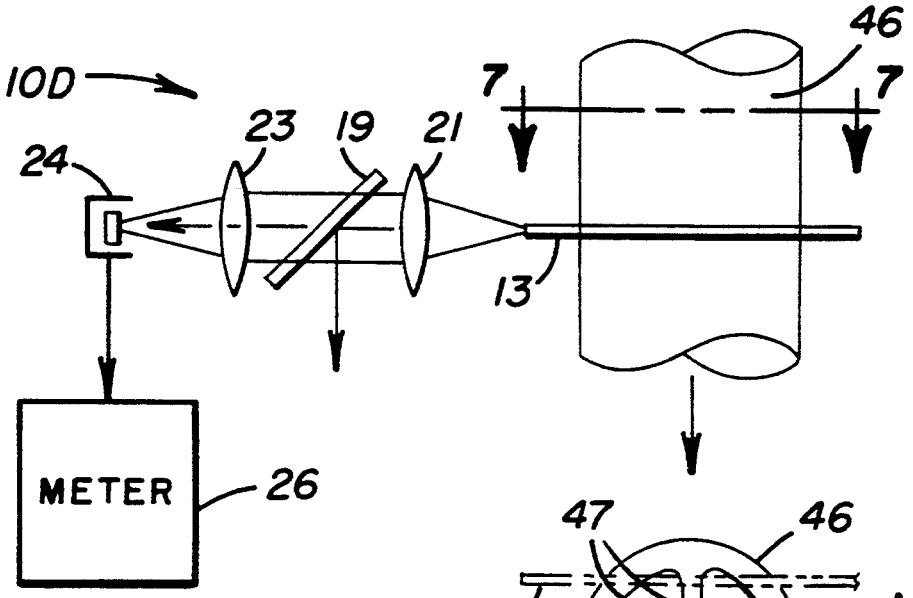
FIG. 6 is a generally schematic illustration of the use of a fluorescent fiber in the diagnosis of the intensity of a large diameter laser beam.

FIG. 6 illustrates yet another diagnostic system 10D wherein a fluorescent fiber 13 is disposed crosswise of a large diameter light beam 46 to measure the intensity of the beam 46.

In this case, some of the light from beam 46 will pass through the wall of fiber 13 and be absorbed by the dopant in the core 16 of the fiber 13. This pumping by the excitation wavelength will again cause fluorescence at a longer wavelength of light beam 46 in the core which can be detected at 24 and measured by meter 26. Previous efforts which attempted to use optical fibers without doping in a laser beam did not effectively send light along the core of a probe fiber.

Figure 7:
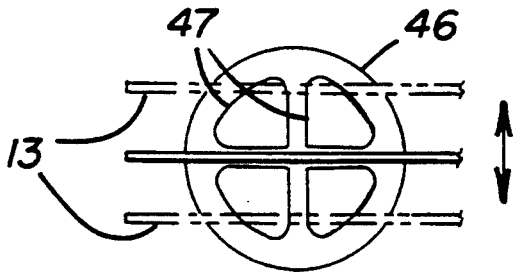
FIG. 7 is a view transverse to the laser beam of FIG. 6, illustrating the manner in which the diagnostic fiber can be moved through the beam.

If the light beam 46 is symmetrical, a stationary fiber 13 may be used, with the intensity of the fluorescent output of the fiber providing a good indication of the intensity of the beam 46. However, if the beam 46 has a number of TEM modes, such as indicated at 47 in FIG. 7, then the fiber 13 should preferably be moved traversely across the beam, to positions such as indicated by the phantom line positions of fiber 13, with the fluctuation in fluorescent output of fiber 13 during a sweep across the beam being averaged to provide a measurement of the overall intensity of beam 46.

The foregoing description of the preferred embodiments has been presented for purposes of illustration and description. It is not intended to be exhaustive or to limit the invention to the precise forms described, and obviously many other modifications are possible in light of the above teaching. For example, although lasers are the preferred light source in the present invention, light emitting diodes and other sources may be useful for some applications. The embodiments were chosen in order to explain most clearly the principles of the invention and its practical applications, thereby to enable others in the art to utilize most effectively the invention in various other embodiments and with various other modifications as may be suited to the particular use contemplated. It is intended that the scope of the invention be defined by the claims appended hereto.

It is claimed:

1. A method of using a fluorescing optical fiber having a doped core that will fluoresce at a relatively long wavelength when pumped by light of a shorter wavelength, comprising:

a) pumping said doped core with light of said shorter wavelength to cause fluorescence in said core at said relatively long wavelength b) detecting light of said relatively long wavelength exiting from one end of said fiber c) monitoring the degree of intensity of said detected light of said relatively long wavelength.

2. The method as set forth in claim 1, wherein said doped core is pumped from one end of said fiber.

3. The method as set forth in claim 2, wherein said core is lightly doped so that only a small percentage of the pumping light of said shorter wavelength is absorbed by said core.

4. The method as set forth in claim 2 wherein said pumping light is maintained at a stable level and further including disposing said fiber in a medium that produces changes in the amount of light in said fiber that can escape through the wall of said fiber.

5. The method as set forth in claim 1, wherein said doped core is pumped by a stable level of light of said shorter wavelength from one end thereof, and wherein said doped core is additionally pumped through the wall of said fiber.

6. The method as set forth in claim 5, wherein the pumping light into said doped core from said one end maintains said core in fluorescence just below the lasing level, such that said additional pumping through the wall of said fiber will cause lasing to occur within said core.

7. The method as set forth in claim 1, wherein the pumping of said doped core with light of said shorter wavelength is wholly done through the wall of said fiber.

8. The method as set forth in claim 7, wherein said fiber is disposed in and crosswise of a light beam of said shorter wavelength.

9. The method as set forth in claim 8, and further including moving said fiber in a plane crosswise to said light beam to dispose said fiber in different portions of said light beam.

10. The method as set forth in claim 1, wherein said fluorescent fiber has a core doped with neodymium to cause fluorescence at around 950 nanometers in response to absorption of light of 510 and 578 nanometer wavelengths, and wherein the core of said fiber is pumped by a copper vapor laser beam.

* * * * *